(12) United States Patent
Cheng et al.

(10) Patent No.: US 11,816,841 B2
(45) Date of Patent: Nov. 14, 2023

(54) METHOD AND SYSTEM FOR GRAPH-BASED PANOPTIC SEGMENTATION

(71) Applicants: Ran Cheng, Markham (CA); Ryan Razani, Toronto (CA); Bingbing Liu, Markham (CA)

(72) Inventors: Ran Cheng, Markham (CA); Ryan Razani, Toronto (CA); Bingbing Liu, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 222 days.

(21) Appl. No.: 17/204,930

(22) Filed: Mar. 17, 2021

(65) Prior Publication Data

US 2022/0301173 A1    Sep. 22, 2022

(51) Int. Cl.
*G06T 7/11* (2017.01)
*G06V 10/44* (2022.01)
*G06V 30/262* (2022.01)
*G06F 18/22* (2023.01)
*G06F 18/23* (2023.01)

(52) U.S. Cl.
CPC ............... *G06T 7/11* (2017.01); *G06F 18/22* (2023.01); *G06F 18/23* (2023.01); *G06V 10/44* (2022.01); *G06V 30/274* (2022.01); *G06T 2207/20084* (2013.01)

(58) Field of Classification Search
CPC ........ G06T 7/11; G06V 10/44; G06V 30/274; G06K 9/6215; G06K 9/6218
See application file for complete search history.

(56) References Cited

U.S. PATENT DOCUMENTS

| 2019/0065867 A1 | 2/2019 | Huang et al. |
| 2020/0082219 A1 | 3/2020 | Li et al. |
| 2021/0026355 A1* | 1/2021 | Chen ..................... G06T 5/50 |

(Continued)

FOREIGN PATENT DOCUMENTS

| CN | 110008808 A | 7/2019 |
| CN | 110276765 A | 9/2019 |
| CN | 111428726 A | 7/2020 |

OTHER PUBLICATIONS

Abu-El-Haija, Sami, et al. "N-gcn: Multi-scale graph convolution for semi-supervised node classification." uncertainty in artificial intelligence. PMLR, 2020. (Year: 2020).*

(Continued)

*Primary Examiner* — Bernard Krasnic

(57) ABSTRACT

In methods and systems for graph-based panoptic segmentation of point clouds, points of a point cloud are received with a semantic label from a first category. Further, a plurality of unified cluster feature vectors from a second category are received, each being extracted from a cluster of points in the point cloud. Nodes of a constructed graph represent the unified feature vectors, and edges indicate the relationship between pairs of nodes. The edges are represented as an adjacency matrix indicating the existence or absence of an edge between pairs of nodes. A graph convolutional neural network uses the graph to predict an instance label for each node or an attribute for each edge, wherein the attribute of each edge is used for assigning the instance label to each node.

16 Claims, 6 Drawing Sheets

(56) References Cited

U.S. PATENT DOCUMENTS

2021/0216813 A1* 7/2021 Pouyan .................. G06N 20/00
2021/0279950 A1* 9/2021 Phalak .................. G06V 20/20

OTHER PUBLICATIONS

Wu, Yangxin, et al. "Bidirectional graph reasoning network for panoptic segmentation." Proceedings of the IEEE/CVF Conference on Computer Vision and Pattern Recognition. 2020. (Year: 2020).*
Patil, R. V., and K. C. Jondhale. "Edge based technique to estimate No. of clusters in k-means color image segmentation." 2010 3rd International Conference on Computer Science and Information Technology. vol. 2. IEEE, 2010. (Year: 2010).*
Xia, Peipei, Li Zhang, and Fanzhang Li. "Learning similarity with cosine similarity ensemble." Information Sciences 307 (2015): 39-52. (Year: 2015).*
Yousefhussien, Mohammed, et al. "A multi-scale fully convolutional network for semantic labeling of 3D point clouds." ISPRS journal of photogrammetry and remote sensing 143 (2018): 191-204. (Year: 2018).*
Chebbout, Samira, and Hayet Farida Merouani. "Comparative study of clustering based colour image segmentation techniques." 2012 Eighth International Conference on Signal Image Technology and Internet Based Systems. IEEE, 2012. (Year: 2012).*
Qi, Charles R., et al. "Pointnet: Deep learning on point sets for 3d classification and segmentation." Proceedings of the IEEE conference on computer vision and pattern recognition. 2017. (Year: 2017).*
Mao, Jiageng, Xiaogang Wang, and Hongsheng Li. "Interpolated convolutional networks for 3d point cloud understanding." Proceedings of the IEEE/CVF international conference on computer vision. 2019. (Year: 2019).*
Cheng, Ran, et al. '2-S3Net: Attentive Feature Fusion with Adaptive Feature Selection for Sparse Semantic Segmentation Network' arXiv preprint arXiv:2102.04530 (2021).
Choy, Christopher, JunYoung Gwak, and Silvio Savarese. '4d Spatio-Temporal Convnets: Minkowski Convolutional Neural Networks.' Proceedings of the IEEE/CVF Conference on Computer Vision and Pattern Recognition. 2019.
Qi, Charles R., et al. 'Pointnet: Deep Learning on Point Sets for 3D Classification and Segmentation.' Proceedings of the IEEE conference on computer vision and pattern recognition. 2017.

* cited by examiner

METHOD AND SYSTEM FOR GRAPH-BASED PANOPTIC SEGMENTATION

TECHNICAL FIELD

The present disclosure relates to point cloud processing, particularly methods and systems for graph-based panoptic segmentation of point clouds.

BACKGROUND

Perception is an integral part of various intelligent/autonomous systems in various fields, such as autonomous driving, autonomous manufacturing, inspection, and medical diagnosis. Recently, artificial intelligence is widely used for perception, where computers learn to interpret and understand the visual world using digital images or point clouds. Using images generated by cameras or three dimensional (3D) point clouds generated by light detection and ranging (LiDAR) sensors, a computer can learn a model using deep learning to accurately "perceive" an environment (i.e. identify and classify objects in the images or point clouds) and an intelligent/autonomous systems may react to what is "perceived" in the environment.

A computer may also use segmentation methods to process 2D images or 3D point clouds to perceive a surrounding scene, which is an environment in 2D images or 3D point clouds. Segmentation methods aim to generate a label for every pixel of an image or a label for every point of a point cloud corresponding to a category (e.g. object class) identified in the image or point cloud (e.g. a car or a pedestrian). The plurality of pixels/points with the same label represents a mask (segment) used to identify an object described by the category, e.g. a tree, a person, or a bicycle. While some segmentation methods may detect and identify a "complete" segment such as a bicycle, a car, or a building, others may detect and identify parts of the "complete" segment such as the saddle, the wheels, and the bicycle's pedal of a bicycle without identifying the bicycle as a whole. What is being identified in an image or point cloud depends on what categories the segmentation method is configured to identify.

Traditionally, there are two types of segmentation methods: semantic segmentation methods and instance segmentation methods. Semantic segmentation methods label pixels of an image or 3D points of point clouds with corresponding semantic labels indicative of what categories are being detected in the image or point clouds. For example, all cars detected in an image or point cloud are labelled with a semantic label, the sky is labelled with another semantic label, so as pedestrians, buildings. Therefore, each category has a semantic label. Instance segmentation methods identify each instance of objects represented by the categories in the image or point cloud, then label the points of each instance of objects with an instance label (e.g. every car, bicycle, or building in the scene has a respective instance label). Therefore, semantic segmentation methods label each pixel of an image or point of a point cloud with a semantic label representing its category, but instance segmentation methods further label the points of the instance of objects represented by every category with an instance label. Methods implementing semantic segmentation and instance segmentation use significantly different approaches and techniques.

Another type of segmentation that emerged recently is panoptic segmentation. Panoptic segmentation is particularly useful for autonomous vehicles. It reconciles semantic segmentation methods and instance segmentation methods. It may define the categories of stuff or things. Categories of stuff are labelled as explained above for semantic segmentation, and categories of things are labelled as explained above for instance segmentation. The user of the panoptic segmentation method decides what categories are things and stuff. Usually, things are categories whose instances are required and important for the successful operation of the task the panoptic segmentation is deployed for. For example, in the case of autonomous vehicles, pedestrians, animals, bicycles are important; hence, these categories are things. Instances of buildings, sky, curb are not as important; hence, these categories are stuff. It may be important for the autonomous vehicle to know there are buildings, but it is not as important to know each building's boundaries (instances of the buildings).

Known panoptic segmentation methods usually apply semantic segmentation methods and instance segmentation methods together. One such panoptic segmentation method is described in Det2Seg, proposed in "Zuo, C., et al. 'Det2Seg: A Two-Stage Approach for Road Object Segmentation from 3D Point Clouds,' 2019 IEEE Visual Communications and Image Processing (VCIP), Sydney, Australia, 2019". In Det2Seg, apart from semantic segmentation, two stages are applied for instance segmenation, a coarse stage and a fine-grain stage. The coarse stage uses a complex deep learning model.

Det2Seg requires a complex deep learning model for instance segmentation. Complex deep learning models are usually computationally expensive to implement and run on a computing system, which limits the aforementioned two-stage approach from performing panoptic segmentation in real-time.

Accordingly, it is desirable to provide improved methods and systems for panoptic segmentation of point clouds.

SUMMARY

Methods and systems for graph-based panoptic segmentation for point clouds are described herein. Example embodiments describe methods and systems applied to points with semantic labels of things to generate a graph, comprising nodes and edges, provided to a graph convolutional neural network (GCNN) configured for node classification or edge classification. Node classification predicts instance labels for the points, and edge classification predicts attributes of edges used for assigning instance labels to the points, outputting points with instance and semantic labels. Points with instance and semantic labels are combined with points with semantic labels only, which are points with semantic labels of stuff, generating a point cloud comprising points with semantic labels and points with semantic and instance labels. For identifying instance labels, semantic labels of a semantic segmentation method are leveraged without relying on complex deep learning models; hence, fewer computations are required than those for complex deep learning models.

According to an aspect, the present disclosure provides a method for graph-based panoptic segmentation. The method includes receiving points of a point cloud with a semantic label from a first category and receiving a plurality of unified cluster feature vectors from a second category; each unified cluster feature vector is extracted from a cluster of points in the point cloud. The method constructs a graph comprising nodes and edges from the plurality of unified cluster feature vectors. Each node of the graph is the unified feature vector, and each edge of the graph indicates the relationship between every two nodes of the graph and is represented as an adjacency matrix. The adjacency matrix indicates the existence, or the lack of existence, of an edge between every two nodes. The method feeds the nodes and the adjacency matrix to a graph convolutional neural network configured for predicting an instance label for each node or an attribute for each edge. The attribute of each edge is used for assigning the instance label to each node. The method combines points with semantic labels for the first category and points with instance labels for the second category to generate a labeled point cloud comprising points with both a semantic label and an instance label.

In some example aspects of the method, elements of the adjacency matrix is determined using at least one similarity distance between every two nodes. In some example aspects, at least one similarity distance is a cosine similarity and a Euclidean distance between. In some example aspects of the method, the elements of the adjacency matrix are determined using a criterion, the criterion being the edge exist if the cosine similarity between two nodes is greater than a prespecified threshold and the Euclidean distance between the two nodes is less than another prespecified threshold.

In some example aspects of the method, the graph convolutional neural network is configured for node classification to predict an instance label for each node of the graph, each point of the point cloud being labelled with the instance label of its respective node's instance label.

In some example aspects of the method, the graph convolutional neural network is configured for edge classification to predict an attribute for the edge between every two nodes. The nodes of the graph that are connected together as a mesh with at least one edge are assigned an instance label. Further, each point of the point cloud is labelled with the instance label of its respective node's instance label.

In some example aspects of the method, each unified cluster feature vector is extracted from a plurality of points of a point cloud using at least one of a learnable sparse convolution operation and a PointNet model, which maps the plurality of points the cluster to a 1×k vector, where k is a hyperparameter. In some example aspects of the method, the unified cluster feature vector includes a centroid value of each cluster, generating a unified cluster feature vector of size 1×(k+3).

In some example aspects of the method, each point of the point cloud comprises at least spatial coordinates and a semantic label of the point.

In some example aspects of the method, the plurality of clusters are determined using at least one of k-means clustering, partition around medoids clustering, and density-based clustering (DBSCAN).

In some example aspects, the present disclosure describes a system for graph-based panoptic segmentation using a graph convolutional neural network, comprising a memory storing instructions and one or more processors coupled to the memory and configured to execute the instructions to cause the system to receive points of a point cloud with a semantic label from a first; receive a plurality of unified cluster feature vectors from a second category, where each unified cluster feature vector is extracted from a cluster of points in the point cloud; and constructs a graph comprising nodes and edges from the plurality of unified cluster feature vectors. Each node of the graph is the unified feature vector, and each edge of the graph indicates the relationship between every two nodes of the graph and is represented as an adjacency matrix. The adjacency matrix indicates the existence, or the lack of existence, of an edge between every two nodes. The nodes and the adjacency matrix are fed to a graph convolutional neural network configured for predicting an instance label for each node or an attribute for each edge. The attribute of each edge is used for assigning the instance label to each node. Points with semantic labels for the first category and points with instance labels for the second category are combined to generate points with both a semantic label and an instance label.

In some example aspects of the system, elements of the adjacency matrix are determined using at least one similarity distance between every two nodes. In some example aspects of the system, at least one similarity distance is a cosine similarity and a Euclidean distance between. In some example aspects of the system, the elements of the adjacency matrix are determined using a criterion, the criterion being the edge exist if the cosine similarity between two nodes is greater than a prespecified threshold and the Euclidean distance between the two nodes is less than another prespecified threshold.

In some example aspects of the system, the graph convolutional neural network is configured for node classification to predict an instance label for each node of the graph, each point of the point cloud being labelled with the instance label of its respective node's instance label.

In some example aspects of the system, the graph convolutional neural network is configured for edge classification to predict an attribute for the edge between every two nodes. The nodes of the graph that are connected together as a mesh with at least one edge are assigned an instance label. Further, each point of the point cloud is labelled with the instance label of its respective node's instance label.

In some example aspects of the system, each unified cluster feature vector is extracted from a plurality of points of a point cloud using at least one of a learnable sparse convolution operation and a PointNet model, which maps the plurality of points the cluster to a 1×k vector, where k is a hyperparameter. In some example aspects of the system, the unified cluster feature vector includes a centroid value of each cluster, generating a unified cluster feature vector of size 1×(k+3).

In some example aspects of the system, each point of the point cloud comprises at least spatial coordinates and a semantic label of the point.

In some example aspects of the system, the plurality of clusters are determined using at least one of k-means clustering, partition around medoids clustering, and density-based clustering (DBSCAN).

BRIEF DESCRIPTION OF THE DRAWINGS

Similar reference numerals may have been used in different figures to denote similar components.

DESCRIPTION OF EXAMPLE EMBODIMENTS

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete.

Example embodiments describe methods and systems for graph-based panoptic segmentation of point clouds. The methods and systems include identifying semantic labels for each point in a point cloud, then only some of the identified semantic labels belonging to categories of things are considered for instance segmentation. The points of each segment of things are clustered, and a unified cluster feature vector is determined for each cluster of points of the same semantic label. The unified cluster feature vectors are used to generate a graph, comprising nodes and edges, where each unified cluster feature vector is a node of the graph. The edges of the graph describe the relationship between every two nodes. The existence of an edge between every two nodes is represented as an adjacency matrix. Example embodiments describe methods and systems that use a GCNN configured for node classification to predict an instance label for each node. For node classification, the adjacency matrix is determined using a criterion based on a similarity measure between every two nodes. During inference, the GCNN predicts an instance label for each node. The methods and systems assign the instance label to each node's respective points. Other example embodiments describe methods and systems that use a GCNN configured for edge classification to predict an attribute for each edge. For edge classification, the adjacency matrix is determined using the values of a similarity measure. During inference, the GCNN predicts the existence of edges between every two nodes of the graph. The methods and systems assign an instance label to nodes connected by edges and further assigns the instance labels to each node's respective points. Points with semantic labels only, which are points of categories of stuff, and points with semantic and instance labels, which are points of categories of things are combined, generating a labeled point cloud comprising points with semantic labels and points with semantic and instance labels, which is the output of the graph-based panoptic segmentation.

Figure 1:
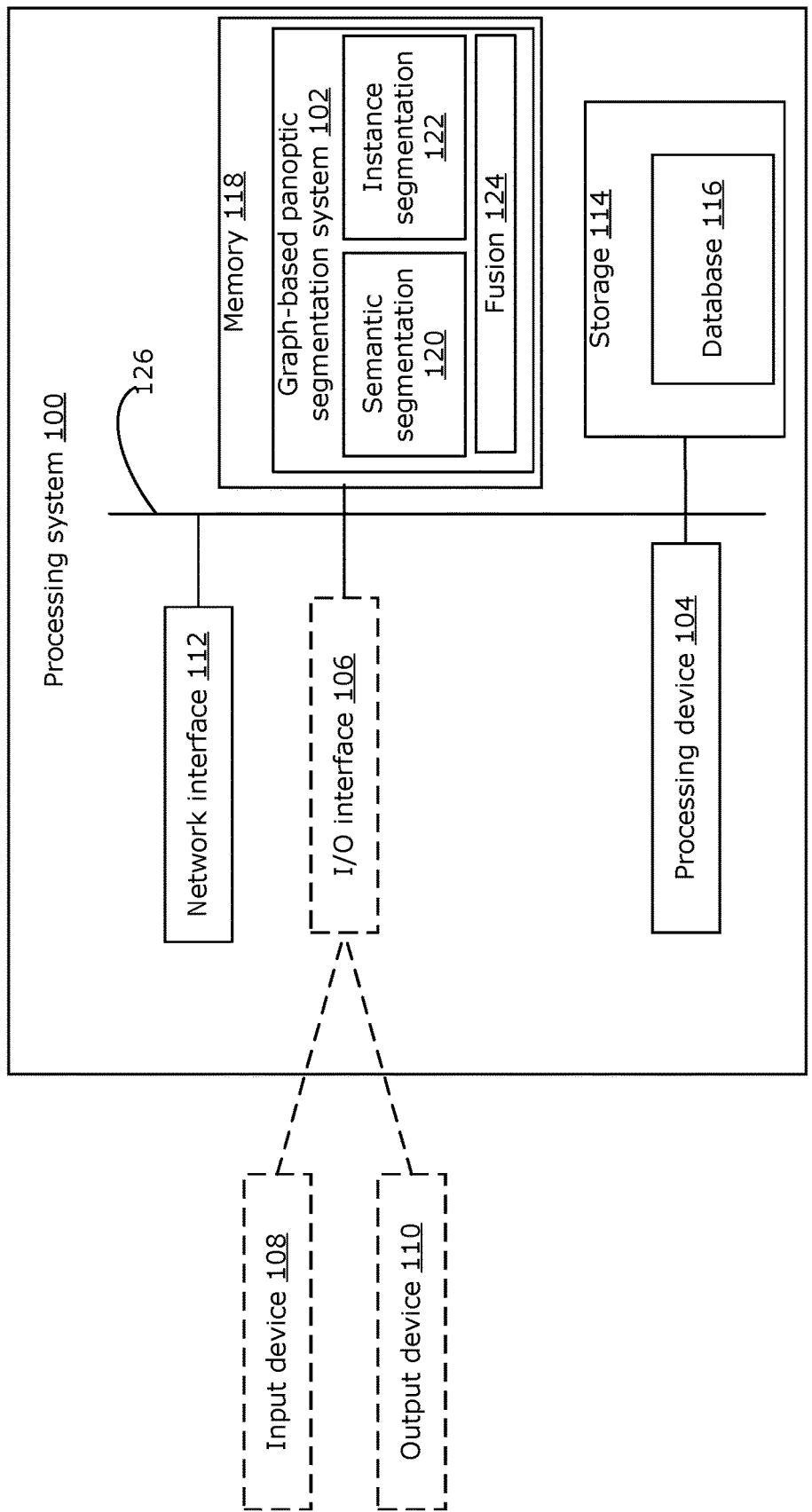
FIG. 1 is a block diagram illustrating an example processing system that can be employed to implement the methods and system disclosed herein.

FIG. 1 is a block diagram of an example simplified processing system 100, which may be used to implement embodiments disclosed herein. The example processing system 100 described below, or variations thereof, may be used to implement a panoptic segmentation system 102. Other processing systems may be suitable for implementing embodiments described in the present disclosure and may include components different from those discussed below. Although FIG. 1 shows a single instance of each component, there may be multiple instances of each component in the processing system 100 (e.g., when the processing system 100 is used to implement graph-based panoptic segmentation system 102).

The processing system 100 may include one or more processing devices 104, such as a processor, a microprocessor, a graphics processing unit (GPU), a tensor processing unit (TPU), an application-specific integrated circuit (ASIC), a field-programmable gate array (FPGA), a dedicated logic circuitry, or combinations thereof. The processing system 100 may optionally include one or more input/output (I/O) interfaces 106 to enable interfacing with one or more optional input devices 108 and/or output devices 110. The processing system 100 may include one or more network interfaces 112 for wired or wireless communication with other processing systems. The network interface(s) 112 may include wired links (e.g., Ethernet cable) and/or wireless links (e.g., one or more antennas) for intra-network and/or inter-network communications.

The processing system 100 may also include one or more storage unit(s) 114, which may include a mass storage unit such as a solid-state drive, a hard disk drive, a magnetic disk drive and/or an optical disk drive. In some example embodiments, the storage unit(s) 114 may include a database 116 for storing training datasets which may be used to train parts of the graph-based panoptic segmentation system 102 as described in further detail below. Although FIG. 1 illustrates the storage unit(s) 114 to include the database 116, in alternative embodiments, the database 116 may be included in one or more remote storage unit(s) that can be accessed remotely via the network interface 112. The database 116 may need to be loaded in memory 118 before being used by the processing device 104.

The processing system 100 may include one or more non-transitory memories 118, which may include a volatile or non-volatile memory (e.g., a flash memory, a random access memory (RAM), and/or a read-only memory (ROM)). The non-transitory memory(ies) 118 may store instructions for execution by the processing device(s) 104, such as to carry out example methods described in the present disclosure. The memory(ies) 118 may store other software (e.g., instructions for execution by the processing device(s) 104), such as an operating system and other applications/functions. In some examples, one or more databases 116 may be provided by an external memory (e.g., an external drive in wired or wireless communication with the processing system 100) or may be provided by a transitory or non-transitory computer-readable medium. Examples of non-transitory computer-readable media include a RAM, a ROM, an erasable programmable ROM (EPROM), an electrically erasable programmable ROM (EEPROM), a flash memory, a CD-ROM, or other portable memory storage. In some examples, the graph-based panoptic segmentation system 102 may be software that includes machine-readable instructions that are stored in the memory 118 and may be executed by the processing device 100. The graph-based panoptic segmentation system 102 includes a semantic segmentation subsystem 120, an instance segmentation subsystem 122, and a fusion subsystem 124. Each of the subsystems 120, 122, and 124 may be software that includes machine-readable instructions that are stored in the memory 118 and may be executed by the processing device 100, may be stored in the memory 118 and may be executed by the processing device 100. In some examples, one or more of the semantic segmentation subsystem 120, the instance segmentation subsystem 122 and the fusion subsystem may implement a method that performs an inference task relying on machine learning. In some examples, the graph-based panoptic segmentation system 102 may be implemented as a single hardware component (e.g., a system on a chip that includes components performing the functions of the semantic segmentation subsystem 120, the instance segmentation subsystem 122, and the fusion subsystem 124). In other examples, multiple chips, each of which performs tasks of the components of the graph-based panoptic segmentation system 102, performed by a respective different hardware component (e.g., separate chips within the processing system 100).

There may be a bus 126 providing communication among components of the processing system 100, including the processing device(s) 104, optional I/O interface(s) 106, network interface(s) 112, storage unit(s) 114 and/or memory(ies) 210. The bus 215 may be any suitable bus architecture, including a memory bus, a peripheral bus, or a video bus.

In FIG. 1, the optional input device(s) 108 (e.g., a keyboard, a mouse, a microphone, a touchscreen integrated into a display device which may include a UI and/or a keypad) and optional output device(s) 110 (e.g., a display device which may include a UI, a speaker and/or a printer) are shown as external to the processing system 100. In other examples, one or more of the input device(s) 108 and/or the output device(s) 110 may be an internal component of the processing system 100. Input device(s) 108 may include a display device having a display screen and a user interface (UI) navigation device (for example, a touchscreen input, a mouse or a handheld controller). The output device(s) 110 may also include a display device having a display screen and a user interface (UI) navigation device for displaying generated results of the graph-based panoptic segmentation system 102.

The panoptic segmentation system 102 assigns instance labels to pixels of images or points of point clouds belonging to objects of categories of things, identifying each instance of objects represented by categories of things, but it assigns semantic labels to pixels of images or points of point clouds belonging to objects represented by categories of stuff, ignoring the object instance of categories of stuff. For example, if cars is a category of things and buildings is a category of stuff, the graph-based panoptic segmentation system 102 may assign instance labels to pixels or points of each car, generating a mask represented by each instance label. The instance label of each instance of cars is unique; hence, the panoptic segmentation system 102 generates a unique mask for each instance of cars. Further, the graph-based panoptic segmentation system 102 may assign semantic labels to pixels of images or point of point clouds belonging to objects represented by a category of stuff, but it may not assign an instance label to the pixels of images or point of point clouds. The semantic label of all instances of buildings is the same; hence, the panoptic segmentation system 102 may generate one mask for all buildings. Normally, the user of the graph-based panoptic segmentation system 102 defines the categories for the stuff and things. Hereinafter, example embodiments consider 3D points (points) of point clouds; however, this should not be considered a limitation and provided for illustration only.

The graph-based panoptic segmentation system 102 includes a semantic segmentation subsystem 120 and an instance segmentation subsystem 122. The semantic segmentation subsystem 120 labels every point with a semantic label, generating masks for all categories in things and stuff (e.g. roads, buildings, trees, cars, pedestrians). There is a multitude of methods, with various accuracy, that may be implemented by the semantic segmentation subsystem 120, including the method in "Cheng, Ran, et al. '2-S3Net: Attentive Feature Fusion with Adaptive Feature Selection for Sparse Semantic Segmentation Network' arXiv preprint arXiv:2102.04530 (2021)". It is to be understood that this method implemented by the semantic segmentation subsystem 120 is an example and is not a limitation and provided for illustration only. Various semantic segmentation methods that accept point clouds as input and label the points of the point clouds with semantic labels may be implemented by the semantic segmentation subsystem 120.

The instance segmentation subsystem 122 is configured to label points belonging to categories of things with their instance labels; instance labels are unique to each instance of the objects of the categories of things. The fusion 124 merges the output of the semantic segmentation 120 and the output of the instance segmentation 122, generating panoptic segmentation, where points of categories of stuff and points of categories of things are labelled, points of categories of stuff with semantic labels and points of categories of things with instance labels and semantic labels.

Figure 2:
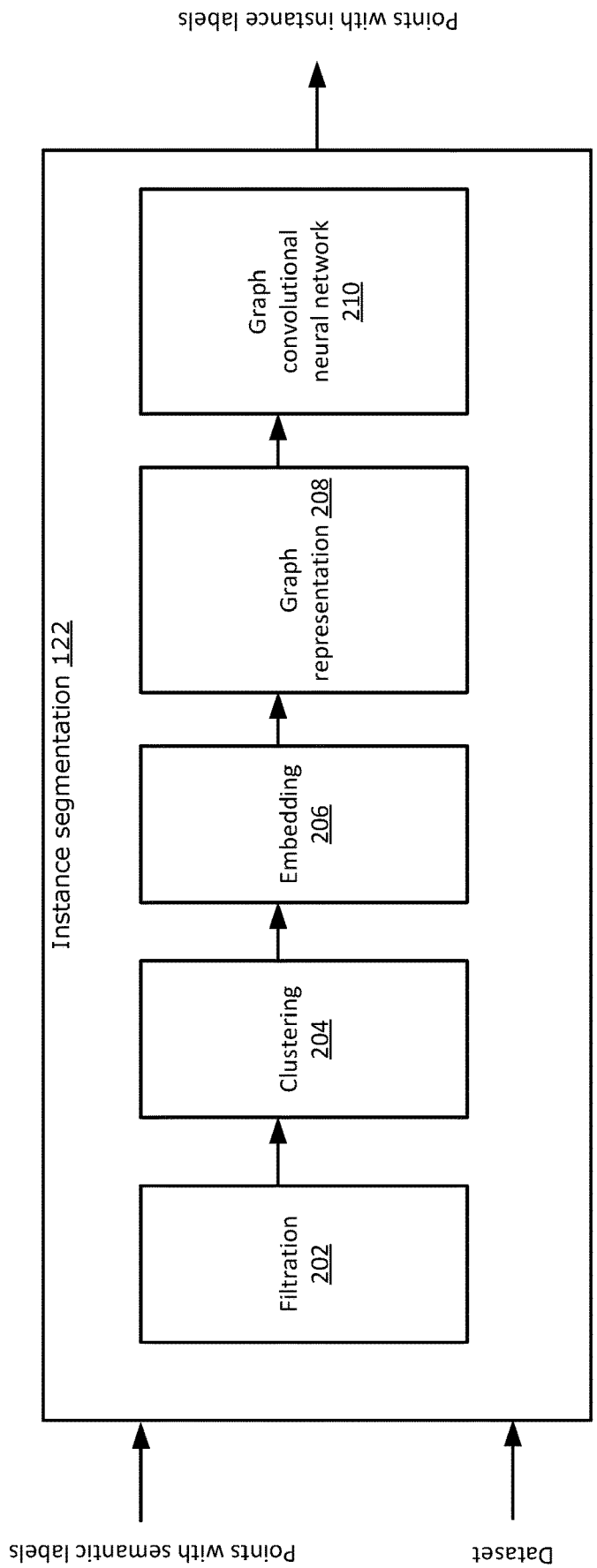
FIG. 2 is a block diagram of an example instance segmentation subsystem, in accordance with an example of the present disclosure.

FIG. 2 is a block diagram of an example instance segmentation in accordance with example embodiments. The instance segmentation subsystem 122 performs several modules, including a filtration module 202, clustering module, an embedding module 206, and a graph representation module 208. The instance segmentation subsystem 122 also includes a graph convolutional neural network (GCNN) 210. The instance segmentation subsystem 122 receives an output from the semantic segmentation subsystem 120, which is points of a point cloud with semantic labels. It may also receive labelled datasets which are used to train the GCNN 210. Each labelled dataset a plurality of labeled point clouds. Each labeled point cloud includes a plurality of point where each point of the plurality of points is labeled with a ground truth semantic label and instance label to train the GCNN 210.

Not all points of a point cloud are processed by the instance segmentation subsystem 122; only those points with semantic labels of categories of things are processed in the instance segmentation subsystem 122. The filtration operation 202 has a list of categories of things and their representing semantic labels (e.g., the category of trees has semantic label 1, the category of cars has semantic label 2). The filtration module 202 is configured to select only points with semantic labels of categories of things for processing by clustering module 204, which partitions points of the same semantic label into clusters of points. The clusters of points are fed to the embedding module 206 configured to extract a unified cluster feature vector from every cluster of points. The unified cluster feature vectors are fed into graph representation 208 to create a graph of nodes and edges. The graph, comprising nodes and edges, is fed to the graph convolutional network (GCNN) 210 to predict nodes' instance labels or edges' attributes used to determine instance labels for the nodes connected by the edges.

Figure 3:
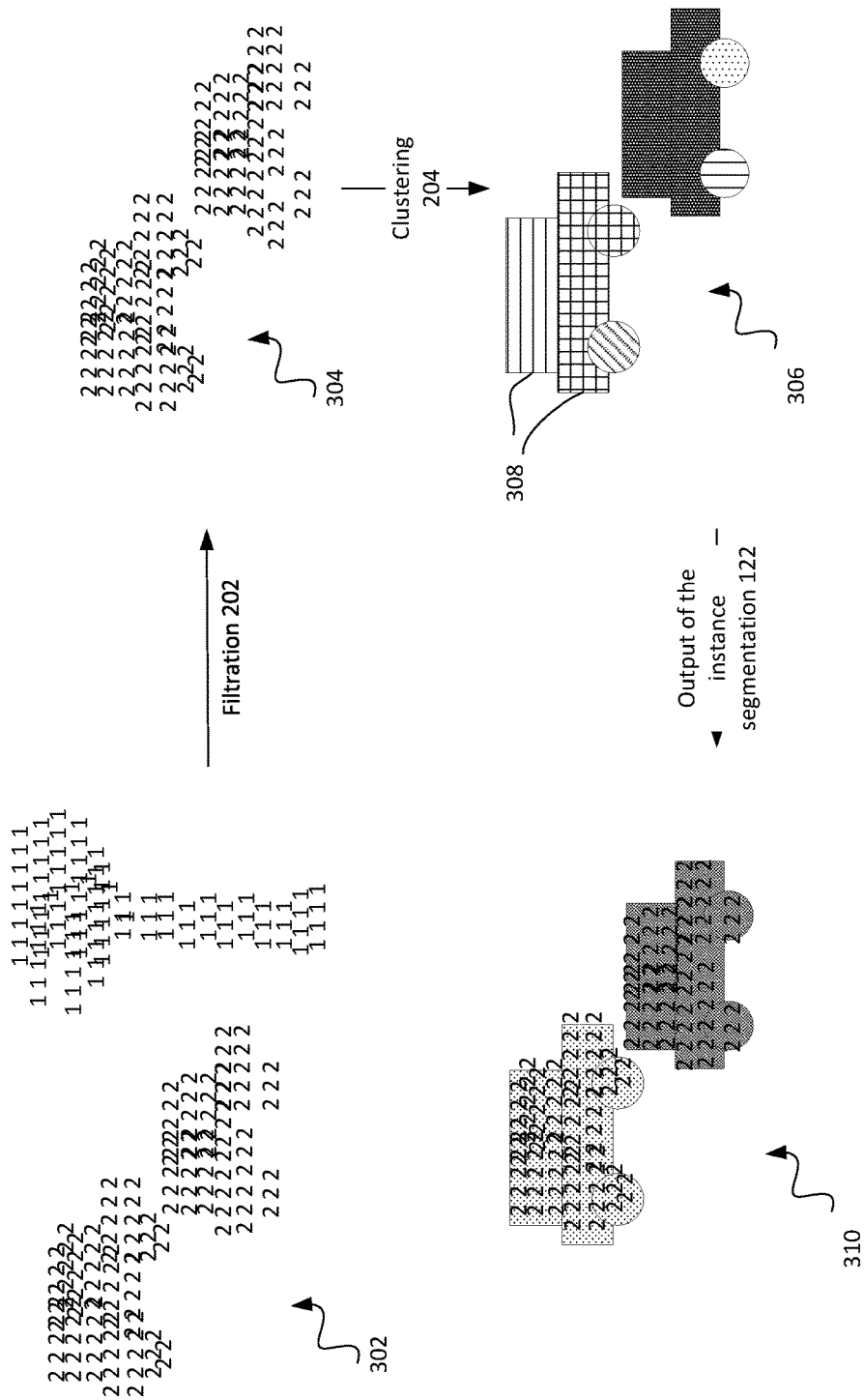
FIG. 3 is an illustrative example of some components' outputs of the instance segmentation subsystem, in accordance with an example of the present disclosure.

FIG. 3 is an illustrative example of some components' outputs of the instance segmentation subsystem 122, according to example embodiments. For example, points with semantic labels 302 comprise labels 1 and 2, 1 referring to trees and 2 referring to cars. There are no instance labels for the segments such that both segments 302 of cars have the semantic label 2 only. The filtration 202 keeps categories of things 304 only for further processing in the embedding 206.

Referring to FIG. 2, clustering module 204 is configured to partition points received from the filtration module 202 into clusters based on a similarity measure. Clustering module 204 applies a clustering operation to the plurality of points of every semantic label. Clustering module 204 groups points with internal similarities. Example embodiments apply different types of clustering methods. For example, k-means clustering, which uses Mahalanobis distance, partition around medoids (PAM) clustering, or density-based clustering (DBSCAN), a nonparametric method. The clustering module 204 groups every plurality of points into a cluster. Each cluster of points may have a different number of points than other clusters. In the illustration in FIG. 3, the output of the clustering 204 is clustered points 306; each pattern corresponds to a cluster of points 308 (only two of which are labelled). The cluster patterns are cluster labels representing each cluster of points. Points at this stage have semantic labels and cluster labels. It could be observed that clusters of points 308 are of different sizes. In other words, a different number of points form each cluster of points 308. The method implemented by clustering 204 is applied to every semantic label in the point cloud. After feeding the clustered points 306 into the graph representation 208 and the GCNN 210, the output includes points with semantic labels and instance labels, shown as masks 310 (described in detail below).

In FIG. 2, embedding module 206 encodes the plurality of points of every cluster into a unified 1×k dimensional feature vector, where k is a hyperparameter stored in memory 110. Example embodiments may use a learnable sparse convolution operation such as Minkowski convolutional neural networks in "Choy, Christopher, JunYoung Gwak, and Silvio Savarese. '4d Spatio-Temporal Convnets: Minkowski Convolutional Neural Networks.' Proceedings of the IEEE/CVF Conference on Computer Vision and Pattern Recognition. 2019." Other example embodiments may use the PointNet model as in "Qi, Charles R., et al. 'Pointnet: Deep Learning on Point Sets for 3D Classification and Segmentation.' Proceedings of the IEEE conference on computer vision and pattern recognition. 2017." It is to be appreciated that these two methods are examples, not meant to be a limitation, and provided for illustration only. Other embedding 206 methods that encode a n×m matrix and extract a unified cluster feature vector of the n×m matrix may be applicable. The n×m matrix represents a cluster of points, and it comprises n points forming the cluster of points where each point is of m elements. Each point of a cluster of points, at this stage of processing, may have five parameters (m): normal x,y,z coordinates, an intensity value, and a semantic label. Therefore, regardless of the number of points in a cluster of points, the output of the embedding module 206 is a feature vector of size 1×k, the unified cluster feature vector.

Example embodiments may concatenate the unified cluster feature vector with the three centroid values of each cluster of points (x dimension centroid value, y dimension centroid value, and z dimension centroid value), making the unified cluster feature vector of size 1×(k+3). It is understood that any methods hereinafter applicable to the unified cluster feature vector of size 1×k are also applicable to the unified cluster feature vector after appending the centroid data, i.e., unified cluster feature vector of size 1×(k+3). It is understood that other data may be concatenated with the unified cluster feature vector. The centroid value concatenation was just an example and not a limitation and provided for illustration only.

Graph representation module 208 receives the output of the embedding module 206, which is the unified feature vector of each cluster of points and outputs a graph comprising nodes and edges, where each node is a unified feature vector of a cluster of points, and each edge is represented nodes by an adjacency matrix. The adjacency matrix is a square matrix describing edge connections between two nodes in the graph.

Figure 4:
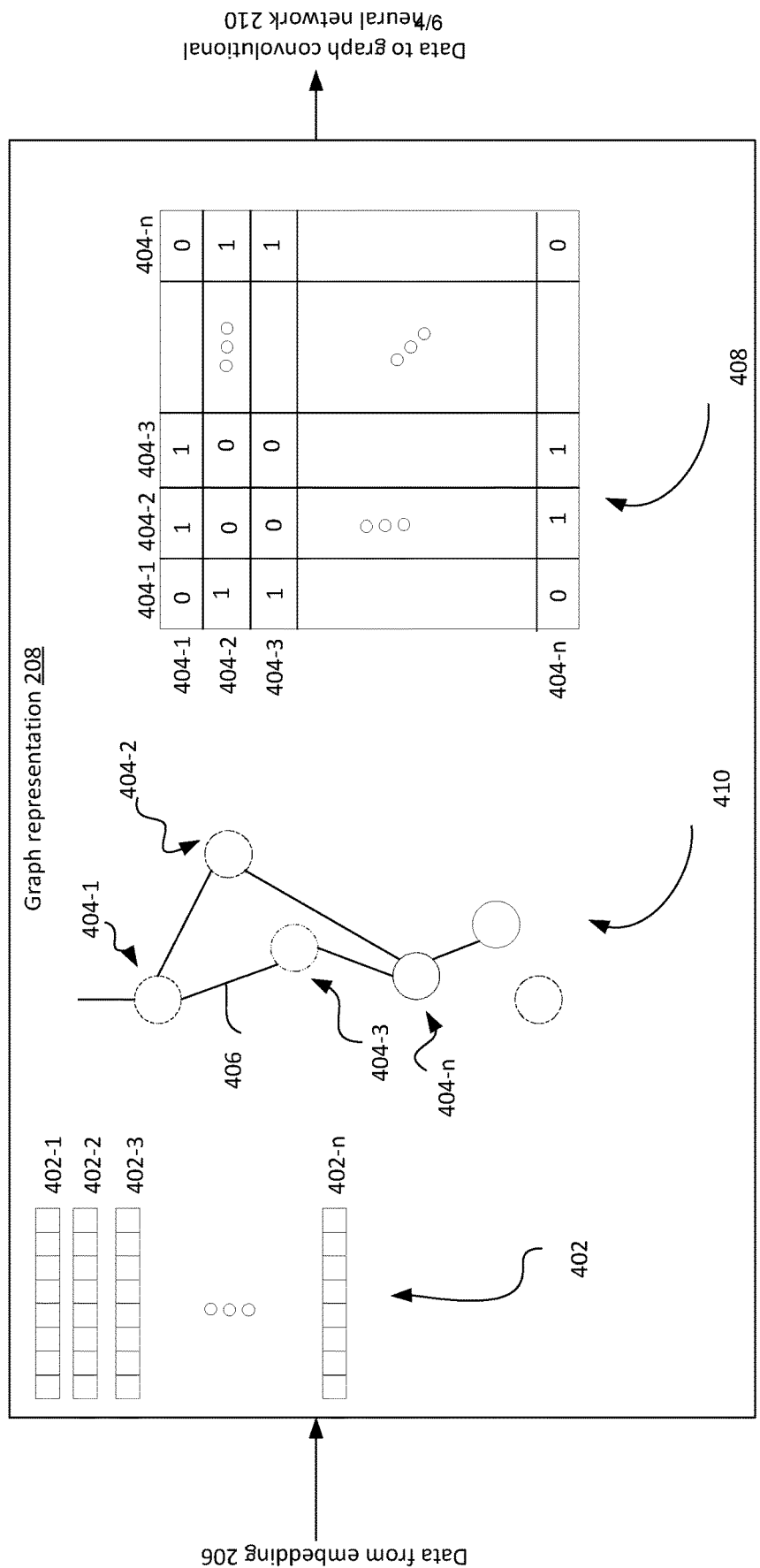
FIG. 4 is a hypothetical example explaining graph representation of unified cluster feature vectors, in accordance with an example of the present disclosure.

FIG. 4 is a hypothetical example explaining operations performed by the graph representation module 208. The graph representation module 208 receives a set of unified cluster feature vectors 402 comprising n unified cluster feature vectors (402-1, 402-2, 402-3, . . . 402-n). The set of unified cluster feature vectors 402 are nodes 404 (404-1, 404-2, 404-3, 404-n) of a graph 410, where each unified cluster feature vector (402-1, 402-2, 402-3 . . . 402-n) is a node (404-1, 404-2, 404-3, . . . 404-n) in the graph 410. Edges 406 (one of which is labelled) may connect the nodes (404-1, 404-2, . . . ). The edges connecting the nodes are represented in an adjacency matrix 408, which indicates the relationships between the nodes 404. The graph representation module feeds graph 410 to the GCNN 210 for training. Example embodiments describe methods and systems for training a GCNN 210 in a supervised learning algorithm for node classification to predict instance labels for the nodes 404. In such example embodiments, each node 404 is labelled with an instance label. The points are labelled with the instance label of their respective nodes.

Example embodiments describe methods and systems for training a GCNN 210 in a supervised learning algorithm for edge classification to predict the attributes of edges 406. In such example embodiments, the GCNN 210 predicts the attributes of the edges 406 connecting the nodes 404. Nodes 404 connected with each other by at least one edge 406 are grouped and labelled with an instance label of the group. The points of the unified feature vector associated with each node 404 in the group are labelled with the instance label of the group.

The GCNN 210 receives as input X, which is an n×k matrix, where n is the number of clusters of points, which is also the number of unified feature vectors 402, and k is the size of each unified cluster feature vector. It also receives the adjacency matrix 406 A (edge 406 information).

Node Classification

Example embodiments describe methods and systems to train the GCNN 210 for node classification using a supervised learning algorithm to predict an instance label for each node 404. The training dataset, stored in database 116, contains labeled point clouds with semantic and instance labels. Hence, the target instance label of each node 404 is known during the training of the GCNN 210.

The GCNN 210 is a multi-layer convolutional neural network which process graphs (e.g. graph data) and may be understood as a neural network that includes a first layer (generally referred to as an input layer), a plurality of hidden layers, and a final layer (generally referred to as an output layer). The "plurality" herein does not have a special metric.

Processing at each layer of the GCNN 210 may be relatively straightforward. Briefly, the operation at each layer $H^{l+1}$ is indicated by equation (1):

$$H^{l+1}=f(H^l,A)=\sigma(AH^lW^l+b^l) \quad (1)$$

where $f$ is a function, $H^0=X$, l is the layer number, $\sigma$ is an activation function, a linear or non-linear activation function, $W^l$ is the weight matrix of layer l, and $b^l$ is the bias of layer l. The activation function ensures values that are passed on to a subsequent layer within a tunable, expected range. The parameters $W^l$ and $b^l$ are learned during the training of the GCNN 210. A is the adjacency matrix 406.

The adjacency matrix is symmetric. When training the GCNN 210 for node classification, the adjacency matrix 406 may be populated with ones and zeros, an attribute value of 1 for a connection and an attribute value of 0 for no connection. Since there is no self-loop, the diagonal of the adjacency matrix 408 has values of zero.

The existence of an edge 406 connecting two nodes 404 is determined using a similarity measure. Example embodiments use Euclidean distance and cosine similarity as the similarity measure. Each node 404 is a unified cluster feature vector 402. The cosine similarity measure is determined between every two nodes in the graph computed as follows:

$$\cos(\theta) = \frac{A.B}{\|A\| \|B\|} = \frac{\sum_{i=1}^{n} A_i B_i}{\sqrt{\sum_{i=1}^{n} A_i^2} \sqrt{\sum_{i=1}^{n} B_i^2}} \quad (2)$$

where $A_i$ and $B_i$ are elements of vectors A and B respectively, vectors A and B are unified cluster feature vectors 402 associated with two nodes 404.

The Euclidean distance between two nodes 404 may be computed using the follow:

$$d(A, B) = |A - B| = \sqrt{\sum_{i=1}^{n} (A_i - B_i)^2} \quad (3)$$

where $A_i$ and $B_i$ are elements of vectors A and B, respectively, where vectors A and B are unified cluster feature vectors 402 associated with two nodes 404.

An edge is determined to exist between nodes 404 if the cosine similarity $\cos(\theta)$ between the nodes' respective unified cluster feature vector is greater than a prespecified threshold $Th_{cos}$ and the Euclidean distance d(A,B) between them is smaller than a prespecified thresh $Th_d$. While example embodiments used the aforementioned distances, other distances may be applied, including the generalized form of the Euclidean distance, Minkowski distance.

Example embodiments may impose a self-loop edge, i.e., adding 1 to the edge 406 of the node 404 with itself to be included in computations of equation (1). Example embodiments may perform normalization methods, which change input data into a common scale for faster convergence during training. The normalization method may be batch normalization, layer normalization, group normalization, or other normalization methods. In some examples, the activation function is a linear function such as binary step, rectified linear unit (ReLU), leaky ReLU, identity, randomized ReLU, while other examples, the activation function is a non-linear function such as sigmoid, step, tanh, swish, inverse square root unit (ISRU), soft plus, square non-linearity, inverse square root linear, exponential linear unit, and other types of non-linear functions.

Training of a GCNN 210 adjusts the parameters (weights $W^l$ and bias $b^l$) of each layer l. An example method utilizes backpropagation in training the GCNN 210. Backpropagation is used to adjust (also referred to as update) a value of a parameter (e.g., a weight) in the GCNN 210 so that the error (or loss) in the output becomes smaller. For example, a defined loss function, such as cross-entropy loss, is calculated through forward propagation of an input to an output of the GCNN 210, and a gradient algorithm (e.g., gradient descent) is used to update the parameters to reduce the loss function. This process is done iteratively and is referred to as "tuning." With each iteration, called epoch, the cross-entropy loss decreases until the parameters of the GCNN 210 are optimized. After the GCNN 210 is trained, the weights and biases are fixed and may be used in real-time operations to predict output values; in other words, make inferences. It is to be understood that other GCNN 210 training methods may replace backpropagation with another method. Backpropagation is an example, not intended to be a limitation, and provided for illustration only. Example embodiments may describe methods and systems that may use other loss functions, including mean squared error.

The output is a matrix Y indicates each node's 404 likelihood of being one of the instance labels of the target instance labels in the training dataset. During training, the target (ground truth) instance labels are obtained from the training dataset, where each point of the point clouds in the training dataset has an instance label. During training, each node 404 has the instance label of their points. During inference, the GCNN 210 predict each node's instance label, and the points are labelled with the instance label of its respective predicted node's instance label.

Edge Classification

Example embodiments train the GCNN 210 for edge classification using a supervised learning algorithm to predict the attribute of each edge 406 as being 1 (connection exist) or 0 (connection doesn't exist). In other words, GCNN 210 decides whether an edge 406 between two nodes 404 exists or not. During training, the nodes 404 of the graph 410 are represented the same way as the nodes 404 of the graph 410 in the node classification above (i.e. each node is a unified cluster feature vector 402) The edges 406, represented as an adjacency matrix 408, has values of the cosine similarity, computed as in equation (2), and the Euclidean similarity, computed as in equation (3), of every two nodes 404. The GCNN 210 is trained as described above, where nodes 404 and the adjacency matrix 408 are used as input. The output GCNN 210 is a matrix Y indicating the nodes 404 and their respective predicted edges 406; the Y is in the same format as the adjacency matrix 408. The output Y is compared to a ground truth adjacency matrix 408, indicating the relationship between the nodes 404 obtained from the training dataset. The target output is the ground truth adjacency matrix 408. It is compared to the output Y. Further, the cross-entropy loss is determined and backpropagated updating the weights.

During inference, the GCNN 210 predicts the attribute of every edge 406 between every two nodes 404. The nodes 404 connected together by edges 406 predicted by the GCNN are assigned an instance label. The points are labelled with the instance label of its respective node's instance label.

Figure 5:
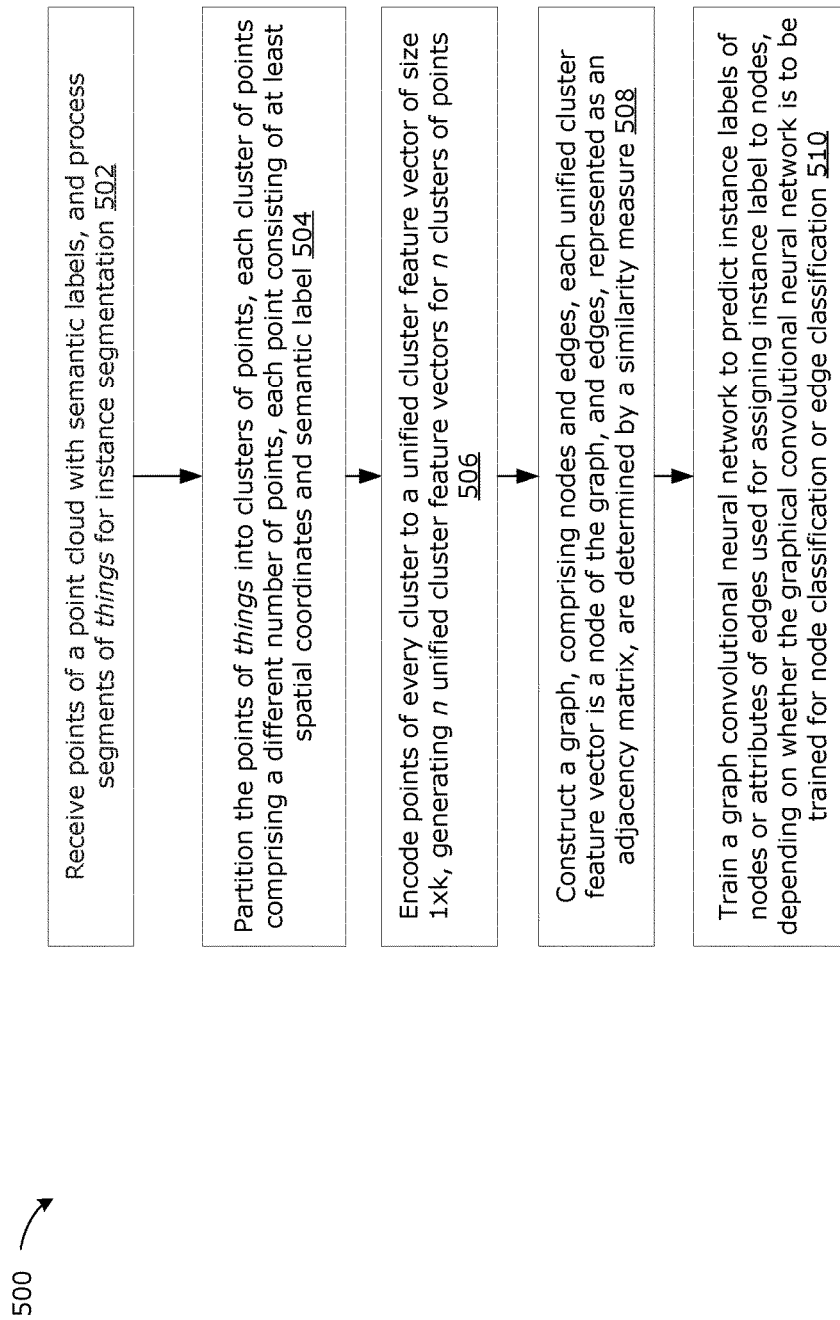
FIG. 5 is a flowchart of an example method for training an instance segmentation, in accordance with an example of the present disclosure.

FIG. 5 is a flowchart of an example method for training an instance segmentation in accordance with an example embodiment. The instance segmentation method 500 receives points of a point cloud labelled with semantic labels, considers the points of categories of things for instance segmentation 122 and filters out the points of categories of stuff 502. The method 500 applies a clustering method to partition the point cloud into clusters. Each cluster of points consists of a plurality of points, and each point has at least its spatial coordinates and the point's semantic label 504. Clusters of points may have different numbers of points; therefore, the method 500 encodes the plurality of points of every cluster of points of n clusters in the point cloud into a unified cluster feature vector of size 1×k, generating a total of n unified cluster feature vectors 506.

The method 500 then represents the unified cluster features as a graph, comprising nodes and edges, such that each unified cluster feature vector 402 is a node 404 of the graph and the edges 406 of the graph, representing the relationships between the nodes, are represented as an adjacency matrix 508. For node classification, the adjacency matrix is determined using a criterion based on a similarity measure between every two nodes. For edge classification, the adjacency matrix is determined using the values of a similarity measure.

The nodes 404, which carry the data of the unified cluster feature vector, and the adjacency matrix 408 are fed to train a GCNN 210 to predict instance label of nodes or attributes of edges, depending on whether the GCNN 210 is to be trained for node 404 classification or edge 406 classification. GCNN 210, through training, may update the GCNN's 210 weights and biases to learn to predict each node's 404 target instance label or each edge's target attribute, depending on whether the GCNN 210 is to be trained for node 404 classification or edge 406 classification 510. The GCNN 210 predicts an instance label for each node 404 or an edge attribute for each edge 406. The instance label of each node or the edge attribute of each edge is compared to the ground truth node 404 instance label or edge 406 attributes from the training dataset, respectively, depending on whether the GCNN 210 is to be trained for node 404 classification or edge 406 classification. Until GCNN 210 is optimally trained, a loss is calculated and backpropagated, updating the weights and biases of the GCNN 210.

Figure 6:
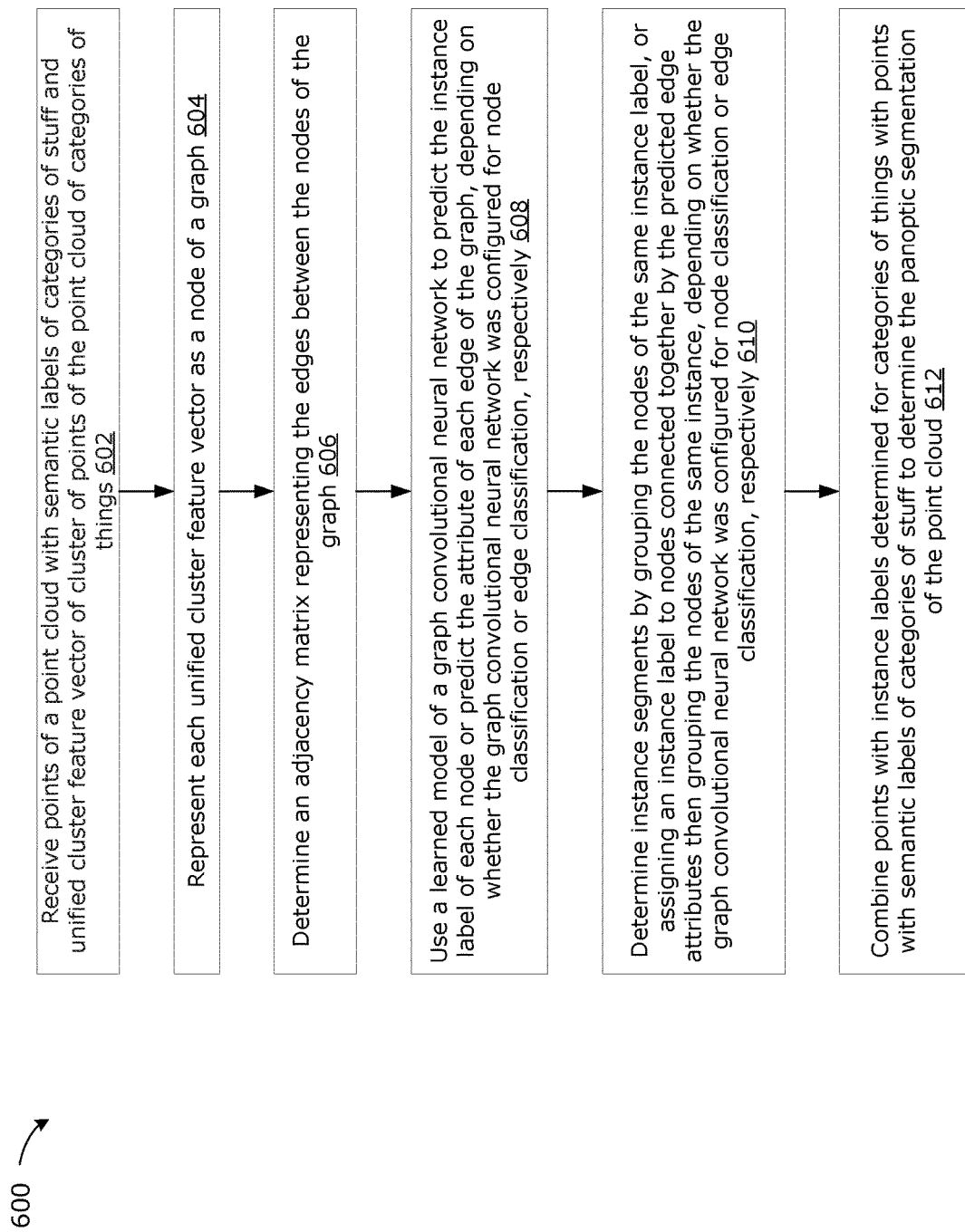
FIG. 6 is a flowchart of an example inference method for graph representation and GCNN to determine panoptic segmentation, in accordance with an example of the present disclosure.

FIG. 6 is a flowchart of an example inference method for graph representation and GCNN for graph-based panoptic segmentation, according to example embodiments. During training, the GCNN 210 learns the appropriate weights and biases. GCNN 210 may be used to perform a given inference task when it is optimally trained. Example embodiments describe a method 600 to perform inference to classify nodes 404, predicting their instance labels. Other example embodiments describe a method to perform inference to classify edges 406, predicting the attribute of edges 406 between nodes 404. The prediction type depends on whether the GCNN 210 is configured through training for node 404 or edge 406 classification. The inference method 600 receives a unified cluster feature vector 402 of each cluster of points of categories of things and points with semantic labels of categories of stuff 602, and represents each unified cluster feature vector 402 as a node 404 of a graph 410 at block 604. The method 600 determines an adjacency matrix 408 describing the edges of the graph 410 at block 606. The adjacency matrix 408 is determined as explained above for node 404 classification or edge 406 classification. For node 404 classification, the adjacency matrix is determined using a criterion based on a similarity measure between every two nodes. For edge classification, the adjacency matrix is determined using the values of a similarity measure. The method forward propagates the input (nodes and adjacency matrix) of the GCNN 210 to the output using the trained weights and biases.

If the GCNN 210 is configured to classify nodes 404, the GCNN 210 predicts the instance labels of every node 404. The method 600 then groups all nodes 404 of the same instance label and assigns the predicted instance labels to their respective point clouds.

If the GCNN 210 was configured to classify edges 406, the GCNN 210 predicts the attribute of the edge between every two nodes. The GCNN 210 in the inference classifies each edge 406 whether it exists or does not exist 608. The nodes 404 connected together edges 406 predicted by the GCNN 210 are assigned an instance label. The points associated with each node 404 are labelled with the instance label of its respective node's instance label.

The disclosed methods of the present disclosure may be carried out by subsystems modules, routines, or subroutines of software executed by the processing system 100. Coding of software for carrying out the steps of the methods is well within the scope of a person of ordinary skill in the art having regard to the methods. The methods for graph-based panoptic segmentation may contain additional or fewer steps than shown and described, and the steps may be performed in a different order. Computer-readable instructions, executable by the processor(s) of the processing system 100, may be stored in the memory 118 of the processing system or a computer-readable medium. It is to be emphasized that the steps of the methods need not be performed in the exact sequence as shown unless otherwise indicated; and likewise, various steps of the methods may be performed in parallel rather than in sequence.

It can be appreciated that the methods for graph-based panoptic segmentation of the present disclosure, once implemented, can be performed by the processing system 100 in a fully-automatic manner, which is convenient for users to use as no manual interaction is needed.

It should be understood by a person skilled in the art that, for the purpose of convenient and brief description, for a detailed working process of the foregoing system, apparatus, and unit, refer to a corresponding process in the foregoing method embodiments, and details are not described herein again.

In the several embodiments described, it should be understood that the disclosed systems and methods may be implemented in other manners. For example, the described system embodiments are merely examples. Further, units or components may be combined or integrated into another system, or some features may be ignored or not performed. In addition, the displayed or discussed mutual couplings or direct couplings or communication connections may be implemented by using some interfaces. The indirect couplings or communication connections between the systems or units may be implemented in electronic, mechanical, or other forms.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices, and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the example embodiments may be integrated into one processing unit, or each of the units may exist alone physically, or two or more units are integrated into one unit.

When the functions are implemented in the form of a software functional unit and sold or used as an independent product, they may be stored in a storage medium and include several instructions for instructing a computer device (which may be a personal computer, a server, or a network device) to perform all or some of the steps of the methods described in the embodiments of this application. The foregoing storage medium includes any medium that can store program code, such as a universal serial bus (USB) flash drive, a removable hard disk, a read-only memory (ROM), a random access memory (RAM), a magnetic disk, or an optical disc, among others.

The foregoing descriptions are merely specific implementations but are not intended to limit the scope of protection. Any variation or replacement readily figured out by a person skilled in the art within the technical scope shall fall within the scope of protection. Therefore, the scope of protection shall be subject to the protection scope of the claims.

The invention claimed is:

1. A method for graph-based panoptic segmentation, the method comprising:
   receiving points of a point cloud with a semantic label from a first category;
   receiving a plurality of unified cluster feature vectors from a second category, each unified cluster feature vector being extracted from a cluster of points in the point cloud;
   constructing a graph comprising nodes and edges from the plurality of unified cluster feature vectors, each node of the graph being one of the plurality of the unified feature vectors, each edge of the graph indicating the relationship between a pair of nodes of the graph and being represented as an adjacency matrix, wherein the adjacency matrix indicates the existence, or the lack of existence, of an edge between every two nodes;
   feeding the nodes and the adjacency matrix to a graph convolutional neural network configured for predicting an instance label for each node or an attribute for each edge, wherein the attribute of each edge is used for assigning the instance label to each node; and
   combining points with semantic labels for the first category and points with instance labels for the second category to generate points with both a semantic label and an instance label,
   wherein each unified cluster feature vector is extracted from a plurality of points of a point cloud using at least one of a learnable sparse convolution operation and a PointNet model, which maps the plurality of points of the cluster to a 1×k vector, where k is a hyperparameter, and
   wherein the unified cluster feature vector includes a centroid value of each cluster, generating a unified cluster feature vector of size 1×(k+3).

2. The method of claim 1, wherein elements of the adjacency matrix are determined using at least one similarity distance between every two nodes.

3. The method of claim 2, wherein the at least one similarity distance is a cosine similarity and a Euclidean distance between.

4. The method of claim 3, wherein the elements of the adjacency matrix are determined using a criterion, the criterion being the edge exist if the cosine similarity between two nodes is greater than a prespecified threshold and the Euclidean distance between the two nodes is less than another prespecified threshold.

5. The method of claim 4, wherein the graph convolutional neural network is configured for node classification to predict an instance label for each node of the graph, each point of the point cloud being labelled with the instance label of its respective node's instance label.

6. The method of claim 3, wherein the graph convolutional neural network is configured for edge classification to predict the attribute for the edge between every two nodes, the nodes of the graph connected together by at least one edge being assigned an instance label, each point of the point cloud being labelled with the instance label of its respective node's instance label.

7. The method of claim 1, wherein each point of the point cloud comprises at least spatial coordinates and a semantic label of the point.

8. The method of claim 1, wherein the plurality of clusters are determined using at least one of k-means clustering, partition around medoids clustering, and density-based clustering (DBSCAN).

9. A system for graph-based panoptic segmentation using a graph convolutional neural network, comprising:
   a memory storing instructions;
   one or more processors coupled to the memory and configured to execute the instructions to:
   receive points of a point cloud with a semantic label from a first category;
   receive a plurality of unified cluster feature vectors from a second category, each unified cluster feature vector being extracted from a cluster of points in the point cloud;
   construct a graph comprising nodes and edges from the plurality of unified cluster feature vectors, each node of the graph being the unified feature vector, each edge of the graph indicating the relationship between every two nodes of the graph and being represented as an adjacency matrix, wherein the adjacency matrix indicates the existence, or the lack of existence, of an edge between every two nodes;
   feed the nodes and the adjacency matrix to a graph convolutional neural network configured for predicting an instance label for each node or an attribute for each edge, wherein the attribute of each edge is used for assigning the instance label to each node; and
   combine points with semantic labels for the first category and points with instance labels for the second category to generate points with both a semantic label and an instance label,
   wherein each unified cluster feature vector is extracted from a plurality of points of a point cloud using at least one of a learnable sparse convolution operation and a PointNet model, which maps the plurality of points the cluster to a 1×k vector, where k is a hyperparameter, and
   wherein the unified cluster feature vector includes a centroid value of each cluster, generating a unified cluster feature vector of size 1×(k+3).

10. The system of claim 9, wherein elements of the adjacency matrix are determined using at least one similarity distance between every two nodes.

11. The system of claim 10, wherein the at least one similarity distance is a cosine similarity and a Euclidean distance between.

12. The system of claim 11, wherein the elements of the adjacency matrix are determined using a criterion, the criterion being the edge exist if the cosine similarity between two nodes is greater than a prespecified threshold and the Euclidean distance between the two nodes is less than another prespecified threshold.

13. The system of claim 12, wherein the graph convolutional neural network is configured for node classification to predict an instance label for each node of the graph, each point of the point cloud being labelled with the instance label of its respective node's instance label.

14. The system of claim 11, wherein the graph convolutional neural network is configured for edge classification to predict the attribute for the edge between every two nodes, the nodes of the graph connected together by at least one edge being assigned an instance label, each point of the point cloud being labelled with the instance label of its respective node's instance label.

15. The system of claim 9, wherein each point of the point cloud comprises at least spatial coordinates and a semantic label of the point.

16. The system of claim 9, wherein the plurality of clusters are determined using at least one of k-means clustering, partition around medoids clustering, and density-based clustering (DBSCAN).

* * * * *